(12) United States Patent
Stefaniuk

(10) Patent No.: US 9,084,964 B1
(45) Date of Patent: Jul. 21, 2015

(54) RADIAL FABRIC FILTER FOR PARTICULATE COLLECTION

(71) Applicant: ALSTOM Technology Ltd, Baden (CH)

(72) Inventor: Marek Stefaniuk, Ostfildern (DE)

(73) Assignee: ALSTOM Technology, Baden (CH)

( * ) Notice: Subject to any disclaimer, the term of this patent is extended or adjusted under 35 U.S.C. 154(b) by 0 days.

(21) Appl. No.: 14/272,748

(22) Filed: May 8, 2014

(51) Int. Cl.
*B01D 46/00* (2006.01)
*B01D 53/75* (2006.01)
*B01D 53/40* (2006.01)
*B01D 46/42* (2006.01)
*B01D 46/02* (2006.01)

(52) U.S. Cl.
CPC .............. *B01D 53/40* (2013.01); *B01D 46/002* (2013.01); *B01D 46/023* (2013.01); *B01D 46/4236* (2013.01); *B01D 53/75* (2013.01)

(58) Field of Classification Search
CPC .. B01D 46/0019; B01D 46/002; B01D 53/75; B01D 46/023
USPC .................. 55/341.1, 341.5, 350.1, 482, 484, 55/DIG. 30
See application file for complete search history.

(56) References Cited

U.S. PATENT DOCUMENTS 5,887,973 A    3/1999  Åhman et al.

FOREIGN PATENT DOCUMENTS

| DE | 2751640 A1 * | 5/1979 | ............. B01D 46/10 |
| DE | 102012003824 A1 * | 8/2013 | ............. B01D 46/04 |
| WO | 97/37747 | 10/1997 | |
| WO | WO 2010099317 A2 * | 9/2010 | ............. B01D 46/52 |

* cited by examiner

*Primary Examiner* — Timothy Vanoy
(74) *Attorney, Agent, or Firm* — Rita D. Vacca

(57) ABSTRACT

An air quality control system (AQCS) 214 useful for treating flue gas FG, such as flue gas FG produced by a fossil fuel fired boiler 212 is described. The AQCS 214 is equipped with a dry scrubber 236 and a radial fabric filter 254 with a central chimney 216. The radial fabric filter 254 collects particulates and dried reacted reducing agent from flue gas FG drawn through the radial fabric filter 254 by an axial fan 288 arranged within the central chimney 216.

15 Claims, 4 Drawing Sheets

RADIAL FABRIC FILTER FOR PARTICULATE COLLECTION

FIELD OF THE DISCLOSURE

The present disclosure is generally directed to a relatively compact radial fabric filter for particulate collection processing or treatment of a gas stream. More specifically, the present disclosure is directed to a relatively compact radial fabric filter for use with a dry scrubber system operable for dry flue gas desulfurization (DFGD) processing or treatment of a flue gas stream produced by a fossil fuel fired boiler, a combustion process or the like. A method of using the subject relatively compact radial fabric filter for use with a dry scrubber system operable for DFGD processing or treatment of a gas stream is likewise disclosed.

BACKGROUND OF THE DISCLOSURE

In treating a gas stream or flue gas, dry flue gas desulfurization (DFGD) systems are known. Typically, in DFGD processes, lime (CaO) is first converted to hydrated lime $Ca(OH)_2$ before use by contact with the flue gas to be treated. The hydrated lime is placed in contact with the flue gas as a dry or moistened powder within a circulating dry scrubber (CDS) DFGD system. An example of such a CDS DFGD system is the ALSTOM NID™ system (ALSTOM Power Inc., Paris, France) (NID).

WO 97/37747, invented by Stefan Ahman et al., discloses a device for a CDS DFGD system useful for discharging and distributing an absorbent material in a flue gas duct. Accordingly, in a vertical flue gas duct for flow of flue gases containing gaseous pollutants, the absorbent material discharging and distributing device is arranged. The arranged device discharges and distributes a particulate absorbent material reactive with the gaseous pollutants in the flowing flue gas to convert the gaseous pollutants to a separable dust.

While methods and equipment capable of removing both particulate and gaseous pollutants from a flue gas stream exist, there remains a need for improved DFGD systems with reduced footprint fabric filter systems to reduce associated costs, to allow for installation in existing plants having limited available space, and to allow for future system expansion, while maintaining system stability, efficiency and effectiveness.

SUMMARY

The present disclosure provides an ALSTOM NID™ system (NID) dry flue gas desulfurization (DFGD) system or a like system operable using a dry or moistened powder reducing agent, such as calcium oxide or calcium hydroxide. The subject NID DFGD system or NID like system is equipped with a relatively compact radial fabric filter system. The relatively compact radial fabric filter system reduces filter footprint size requirements thus reducing costs associated therewith. The radial fabric filter system's reduced footprint also allows for system installation in existing plants having limited available space, and allows for future system expansion, while maintaining system stability, efficiency and effectiveness. The NID DFGD system or NID like system is equipped with the relatively compact radial fabric filter system for treatment of flue gas for the removal of sulfur dioxide, and like particulates and gaseous pollutants therefrom. The use of dry or moistened powder calcium oxide or calcium hydroxide is desirable due to lower capital investment requirements and associated operating costs as compared to wet flue gas desulfurization (WFGD) systems or spray dryer absorber (SDA) DFGD systems that operate using an aqueous lime slurry. While the present disclosure is directed to DFGD using a NID system or a NID like system in combination with the subject radial fabric filter system, the teachings of the present disclosure are equally applicable to other systems requiring particulate collection. However, for purposes of clarity and simplicity, the present disclosure is directed to a DFGD NID system equipped with the subject radial fabric filter system particulate collection device as an exemplary embodiment. The subject DFGD NID system equipped with the subject radial fabric filter system particulate collection device achieves system stability, efficiency and effectiveness with reduced footprint requirements thus reducing costs associated therewith, with limited space requirements for installation in existing plants having limited available space, and with expanded capacity capabilities for future system expansion.

The radial fabric filter of the present disclosure comprises a plurality of filter chambers radially arranged around and fluidly connected to a central chimney. Arranged within the central chimney vertically above a plurality of chimney inlets fluidly connected to the plurality of filter chambers, is an axial fan. The bottom low pressure side of the axial fan is that side of the axial fan in closest proximity to the plurality chimney inlets. The bottom low pressure side of the axial fan draws clean flue gas CG from the filter chambers into the central chimney. The top high pressure side of the axial fan blows clean flue gas CG upwardly through the central chimney to a top open end thereof for release to the environment, or alternatively, to fluidly connected ductwork for additional processing and/or use.

As noted above, in the subject embodiment, the subject radial fabric filter is used in conjunction with a NID DFGD system. The subject NID DFGD system receives flue gas FG produced by a combustion process within a boiler via a fluidly connected gas duct. As such, flue gas FG flows from the boiler through the gas duct and into an inlet damper of a NID DFGD system. The NID DFGD system comprises a flue gas dry scrubber or reactor and a reducing agent distribution device, fluidly connected to a reducing agent supply and a water supply. The reducing agent supply may be in the form of a tank or other suitable container for reducing agent storage. The water supply may be in the form of a tank, a piped water source, or other suitable source for water storage and/or supply. Fluidly connected downstream of the reactor is the subject radial fabric filter for removal of particulate matter from the flue gas prior to release of the so produced clean flue gas CG to the atmosphere via the centrally arranged central chimney. Alternatively, clean flue gas CG may flow through ductwork arranged for further clean flue gas CG processing and/or plant use. Using a NID DFGD system and the subject radial fabric filter, dirty flue gas laden with particulate and/or gaseous pollutants, such as for example, $SO_2$, $SO_3$, HCl, HF, fly ash particulates and/or like acidic contaminants, is treated or processed to produce clean flue gas CG.

To produce clean flue gas CG, flue gas FG from the boiler flows through an inlet damper to enter into the NID DFGD scrubber or reactor. A moistened reducing agent from a reducing agent supply is uniformly dispersed across a horizontal cross section of the NID DFGD scrubber through which the flue gas flows. The moistened reducing agent reacts with acidic flue gas components, e.g., $SO_2$, HCl, $SO_3$ and/or HF. The reacted moistened reducing agent is then dried by the flue gas FG to create a dry reacted particulate by-product. The dry reacted particulate by-product is then captured within the subject radial fabric filter. The captured dry reacted particulate by-product is collected in fluidly connected hoppers within the radial fabric filter and fed back to the reducing agent supply for uniform distribution again within the NID DFGD scrubber. The so produced "clean" flue gas CG flows from the subject radial fabric filter into the fluidly connected central chimney for release therefrom to the atmosphere. Alternatively, the clean flue gas CG may be channeled to flow elsewhere within the plant for further treatment and/or use.

The subject radial fabric filter comprises a plurality of fabric filter chambers. By having a plurality of fabric filter chambers, an operator may isolate one or more individual fabric filter chambers for maintenance while keeping the remaining fabric filter chambers in operation. Likewise, one or more individual fabric filter chambers may undergo "turn down" during periods of low demand/low load/low gas flow/low contaminant output, so as to limit or avoid needless equipment wear, energy consumption and like operation associated costs, while keeping the remaining fabric filter chambers in operation. Additionally, in the case of system expansion, additional fabric filter chambers may be added radially to the central chimney to achieve expanded capacity capabilities without the need for system footprint expansion.

In summary, the present disclosure provides a radial fabric filter for particulate collection from a flue gas produced in a combustion process to produce a clean flue gas. The radial fabric filter comprises a plurality of filter chambers arranged radially around a central chimney, and an axial fan arranged within the central chimney operable to draw flue gas into at least one of the filter chambers for particulate collection therein to produce clean flue gas prior to blowing the clean flue gas through the central chimney for release, further treatment or use. Each filter chamber of the subject radial fabric filter comprises an inlet with a damper movable for opening and closing the inlet. Additionally, each filter chamber of the subject radial fabric filter comprises fabric bags for particulate collection. The radial fabric filter may be supported by a support structure to allow for relatively easy access to the filter chambers for maintenance thereof. Further, the central chimney may optionally include a baffle therein for noise reduction.

The present disclosure also provides a system for treating flue gas produced in a combustion process to produce clean flue gas. The system comprises a moistened reducing agent distributor device operable within a dry scrubber reactor to disperse reducing agent within flue gas flowing through the dry scrubber reactor and a radial fabric filter. The radial fabric filter comprises a plurality of filter chambers arranged radially around a central chimney with an axial fan arranged within the central chimney operable to draw the flue gas with entrained reacted reducing agent into at least one of the filter chambers for particulate collection therein to produce clean flue gas prior to blowing the clean flue gas through the central chimney for release, further treatment or use. Each filter chamber comprises an inlet with a damper movable for opening and closing the inlet. Additionally, each filter chamber comprises fabric bags for particulate collection.

The present disclosure also provides a method of using a radial fabric filter for particulate collection from a flue gas produced in a combustion process to produce clean flue gas. The method comprises arranging a plurality of filter chambers radially around a central chimney, drawing with an axial fan arranged within the central chimney flue gas into at least one of the filter chambers for particulate collection therein to produce clean flue gas, and blowing the clean flue gas through the central chimney for release, further treatment or use. Each filter chamber comprises an inlet with a damper movable for opening and closing the inlet. Also, each filter chamber comprises fabric bags for particulate collection. Further, the radial fabric filter may be supported by a support structure to allow for relatively easy access to the filter chambers for maintenance thereof. Further, the central chimney may optionally include a baffle therein for noise reduction.

The present disclosure also provides a method of using a system for treating flue gas produced in a combustion process to produce clean flue gas. The method comprises dispersing a moistened reducing agent within a dry scrubber reactor to disperse reducing agent within flue gas flowing through the dry scrubber reactor; and using a radial fabric filter comprising a plurality of filter chambers arranged radially around a central chimney with an axial fan arranged within the central chimney to draw the flue gas with entrained reacted reducing agent into at least one of the filter chambers for particulate collection therein to produce clean flue gas prior to blowing the clean flue gas through the central chimney for release, further treatment or use. Each filter chamber comprises an inlet with a damper movable for opening and closing the inlet. Also, each filter chamber comprises fabric bags for particulate collection.

Additional features of the subject system and method will be apparent from the following description from which the subject exemplary embodiment is set forth in detail in conjunction with the accompanying drawings.

BRIEF DESCRIPTION OF THE DRAWINGS

The subject dry flue gas desulfurization system with radial fabric filter system is disclosed in more detail below with reference to the appended drawings wherein.

DETAILED DESCRIPTION

Figure 1:
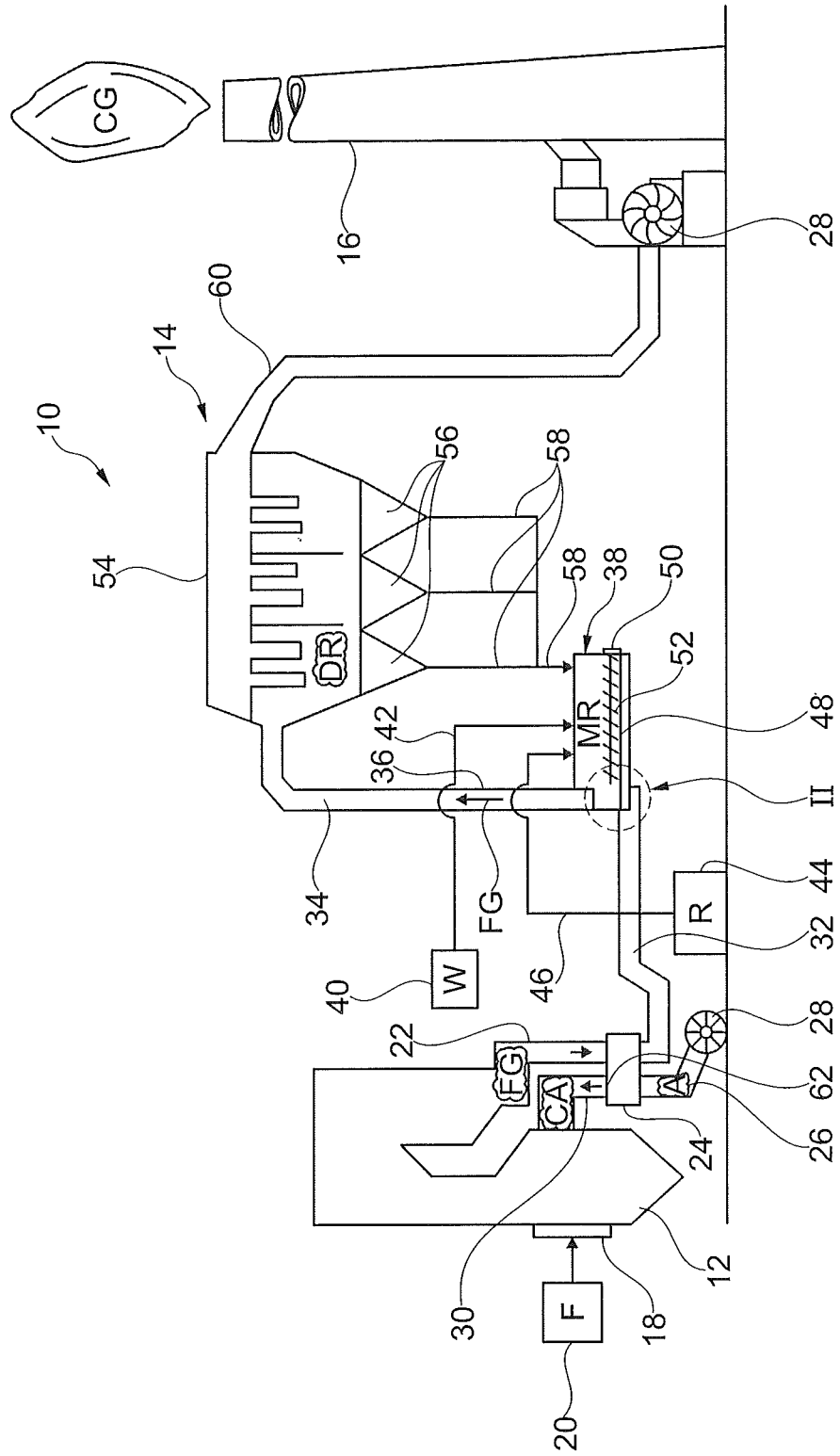
FIG. 1 is a schematic view of a prior art plant with a dry flue gas desulfurization system for cleaning flue gas from a combustion process.

A prior art plant 10, is illustrated in FIG. 1, including a boiler 12, an air quality control system (AQCS) 14 and a stack 16. It is noted that many additional and varied process steps using additional equipment may take place or be positioned between boiler 12 and AQCS 14, as is known to those skilled in the art. Likewise, many additional and varied process steps using additional equipment may take place or be positioned between AQCS 14 and stack 16, as is known to those skilled in the art. Such additional process steps and/or equipment are not described in further detail herein for purposes of clarity and simplicity.

As noted previously, FIG. 1 illustrates schematically a plant 10 with an AQCS 14 for cleaning dirty flue gas FG produced by a combustion process within boiler 12. Boiler 12 is operable for fuel F combustion therein. As such, fuel F is supplied to boiler 12 through fuel inlet 18 from a fluidly connected fuel source 20. Fuel F may be a coal, natural gas, or other like fossil fuel. Hot flue gas FG produced by the combustion of fuel F in boiler 12 contains $SO_2$, $SO_3$, HCl, HF, fly ash particulates and/or like acidic pollutants. The hot flue gas FG flows from boiler 12 through a fluidly connected gas duct 22 fluidly connected to an air preheater 24. Air preheater 24 is used to transfer heat from the hot flue gas FG to air A supplied through a fluidly connected duct 26 from a fluidly connected fan 28. Air A supplied to the air preheater 24 is heated by the hot flue gas FG prior to flow from the air preheater 24 through a fluidly connected duct 30 and into the fluidly connected boiler 12 as combustion air CA. Optionally, a portion of combustion air CA produced by the air preheater 24 may be diverted and used for purposes other than combustion according to plant 10 needs. Likewise, one or more fans 28 may be used in the plant 10 for transport of flue gas FG from the boiler 12 through to stack 16.

From air preheater 24, flue gas FG flows to a fluidly connected gas duct 32. Gas duct 32 has a vertical portion 34 comprising a dry scrubber or reactor 36. In reactor 36 within vertical portion 34 is a distribution device 38. Distribution device 38 introduces, in a manner such as that disclosed in U.S. Pat. No. 5,887,973, a moistened reducing agent such as calcium oxide and/or calcium hydroxide into the flue gas FG flowing through reactor 36. For this purpose, water W from a water supply 40 flows through a fluidly connected pipe 42 to fluidly connected distribution device 38. Likewise, reducing agent R from a reducing agent supply 44 is supplied through a fluidly connected duct 46 to fluidly connected distribution device 38.

Distribution device 38 comprises a container 48 essentially in the shape of an elongated box. Container 48 comprises a motor 50 and a mixer 52 for mixing together water W and reducing agent R supplied thereto from water supply 40 and reducing agent supply 44 to produce moistened reducing agent MR having a water content of approximately 1 percent to approximately 6 percent, or approximately 3 percent. Moistened reducing agent MR is uniformly distributed by the distribution device 38 into the fluidly connected reactor 36 in vertical portion 34 of gas duct 32, as described in further detail below. As such, moistened reducing agent MR may be continuously introduced into reactor 36 for uniform distribution and intermixing contact with the flue gas FG flowing therethrough. After intermixing contact with the flue gas FG, the resultant dry reacted reducing agent DR entrained by the flue gas FG enters a fluidly connected fabric filter 54. Particulate matter including dry reacted reducing agent DR is collected in hoppers 56 of fabric filter 54 and transported through fluidly connected ducts 58 to fluidly connected container 48 for mixture with the moistened reducing agent MR therein. Alternatively, a portion of dry reacted reducing agent DR collected in hoppers 56 may be transported elsewhere for other purposes. Clean flue gas CG flows from fabric filter 54 via fluidly connected duct 60 for release to the atmosphere via fluidly connected stack 16.

Figure 2:
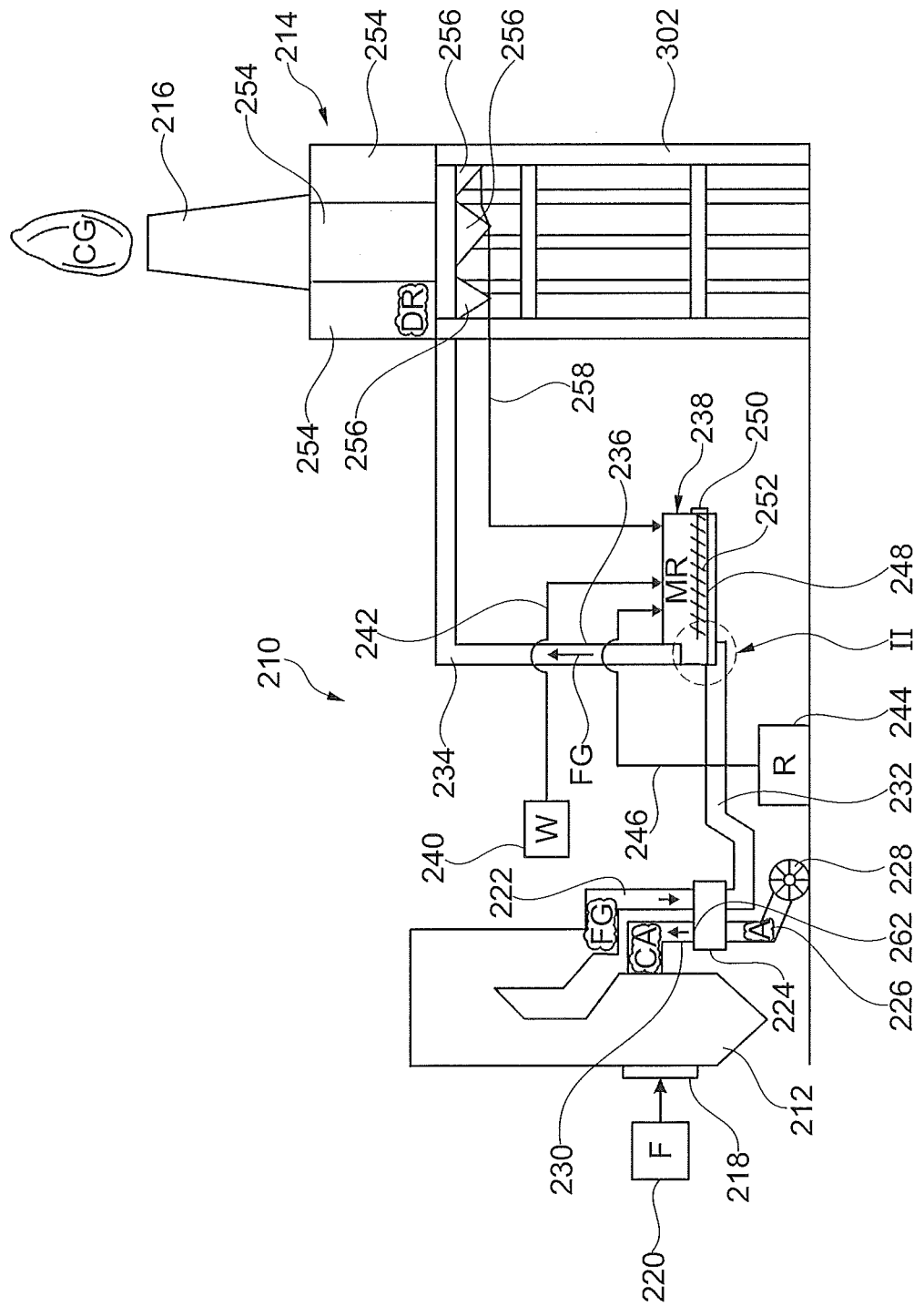
FIG. 2 is a schematic view of a plant with a dry flue gas desulfurization system with a radial fabric filter in accordance with the present disclosure.

FIG. 2 best illustrates the subject system. Features illustrated in FIG. 2, common to those illustrated in FIG. 1, bear the same reference numerals as those of FIG. 1 preceded by the number 2. As such, in FIG. 2, plant 210 includes a boiler 212, an air quality control system (AQCS) 214 and a stack or central chimney 216. It is noted that many additional and varied process steps using additional equipment may take place or be positioned between boiler 212 and AQCS 214, as is known to those skilled in the art. Likewise, many additional and varied process steps using additional equipment may take place or be positioned between AQCS 214 and central chimney 216, as is known to those skilled in the art. Such additional process steps and/or equipment are not described in further detail herein for purposes of clarity and simplicity.

Plant 210 includes an AQCS 214 for cleaning dirty flue gas FG produced by a combustion process within boiler 212. Boiler 212 is operable for fuel F combustion therein. As such, fuel F is supplied to boiler 212 through fuel inlet 218 from a fluidly connected fuel source 220. Fuel F may be a coal, natural gas, or other like fossil fuel. Hot flue gas FG produced by the combustion of fuel F in boiler 212 contains $SO_2$, $SO_3$, HCl, HF, fly ash particulates and/or like acidic pollutants. The hot flue gas FG flows from boiler 212 through a fluidly connected gas duct 222 fluidly connected to an air preheater 224. Air preheater 224 is used to transfer heat from the hot flue gas FG to air A supplied through a fluidly connected duct 226 from a fluidly connected fan 228. Air A supplied to the air preheater 224 is heated by the hot flue gas FG prior to flow from the air preheater 224 through a fluidly connected duct 230 and into the fluidly connected boiler 212 as combustion air CA. Optionally, a portion of combustion air CA produced by the air preheater 224 may be diverted and used for purposes other than combustion according to plant 210 needs. Likewise, one or more fans 228 may be used in the plant 210 for transport of flue gas FG from the boiler 212 through to central chimney 216.

From air preheater 224, flue gas FG flows to a fluidly connected gas duct 232. Gas duct 232 has a vertical portion 234 comprising a dry scrubber or reactor 236. In reactor 236 within vertical portion 234 is a distribution device 238. Distribution device 238 introduces, in a manner such as that disclosed in U.S. Pat. No. 5,887,973, a moistened reducing agent such as calcium oxide and/or calcium hydroxide into the flue gas FG flowing through reactor 236. For this purpose, water W from a water supply 240 flows through a fluidly connected pipe 242 to fluidly connected distribution device 238. Water supply 240 may be in the form of a tank, a piped water source, or other suitable source for water storage and/or supply. Likewise, reducing agent R from a reducing agent supply 244 is supplied through a fluidly connected duct 246 to fluidly connected distribution device 238. Reducing agent supply 244 may be in the form of a tank or other suitable container for reducing agent storage.

Figure 3:
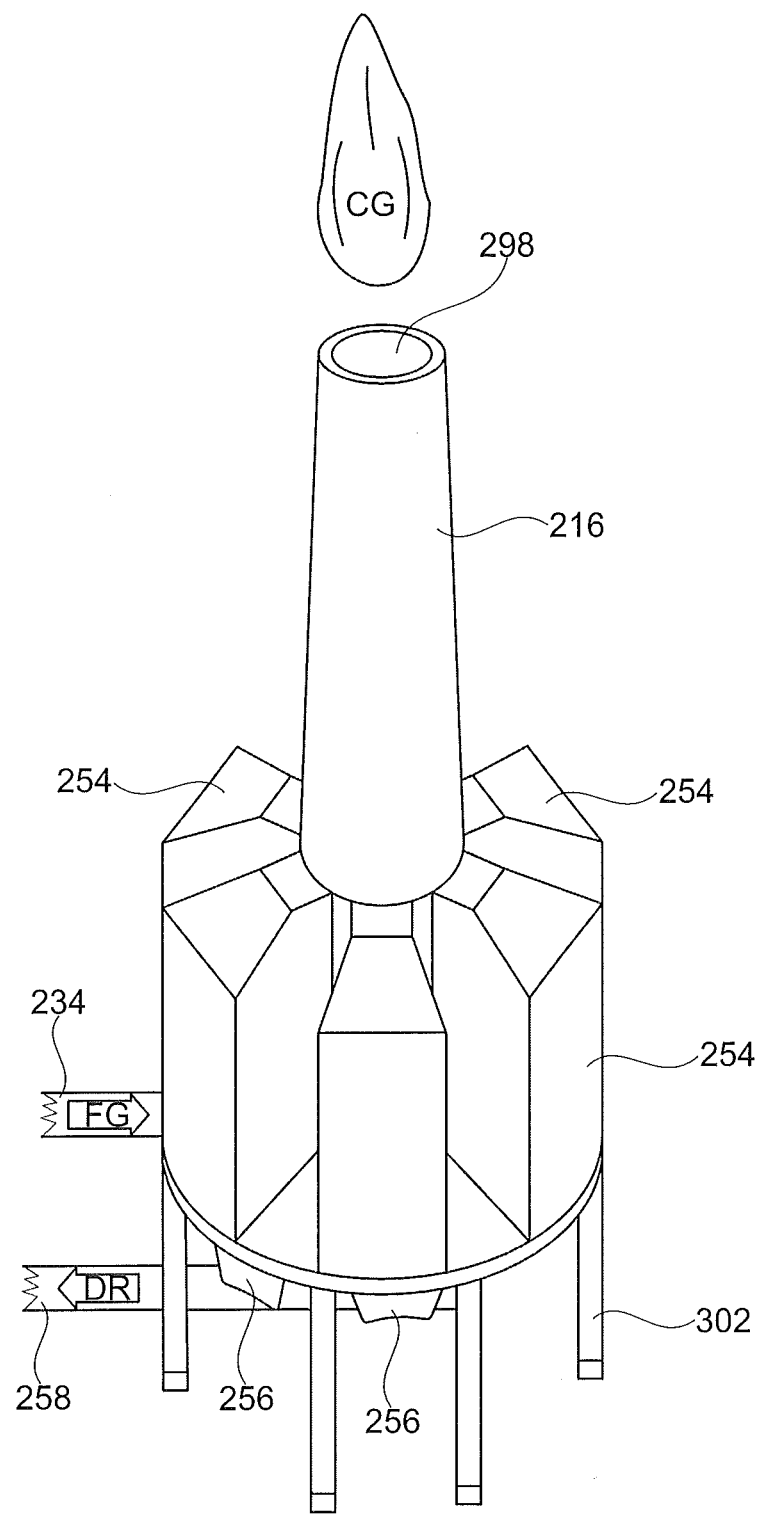
FIG. 3 is an enlarged schematic perspective side view of the radial fabric filter of FIG. 2.

Distribution device 238 comprises a container 248 essentially in the shape of an elongated box. Container 248 comprises a motor 250 and a mixer 252 for mixing together water W and reducing agent R supplied thereto from water supply 240 and reducing agent supply 244 to produce moistened reducing agent MR having a water content of approximately 1 percent to approximately 6 percent, or approximately 3 percent. Moistened reducing agent MR is uniformly distributed by the distribution device 238 into the fluidly connected reactor 236 in vertical portion 234 of gas duct 232, as described in further detail below. As such, moistened reducing agent MR may be continuously introduced into reactor 236 for uniform distribution and intermixing contact with the flue gas FG flowing therethrough. After intermixing contact with the flue gas FG, the resultant dry reacted reducing agent DR entrained by the flue gas FG enters a fluidly connected radial fabric filter 254, illustrated in FIG. 2, FIG. 3 and FIG. 4. Particulate matter including dry reacted reducing agent DR is collected in hoppers 256 of radial fabric filter 254 and transported through fluidly connected duct 258 to fluidly connected container 248 for mixture with the moistened reducing agent MR therein. Alternatively, a portion of dry reacted reducing agent DR collected in hoppers 256 may be transported elsewhere for other purposes. Clean flue gas CG flows from radial fabric filter 254 via central chimney 216 for release to the atmosphere.

Figure 4:
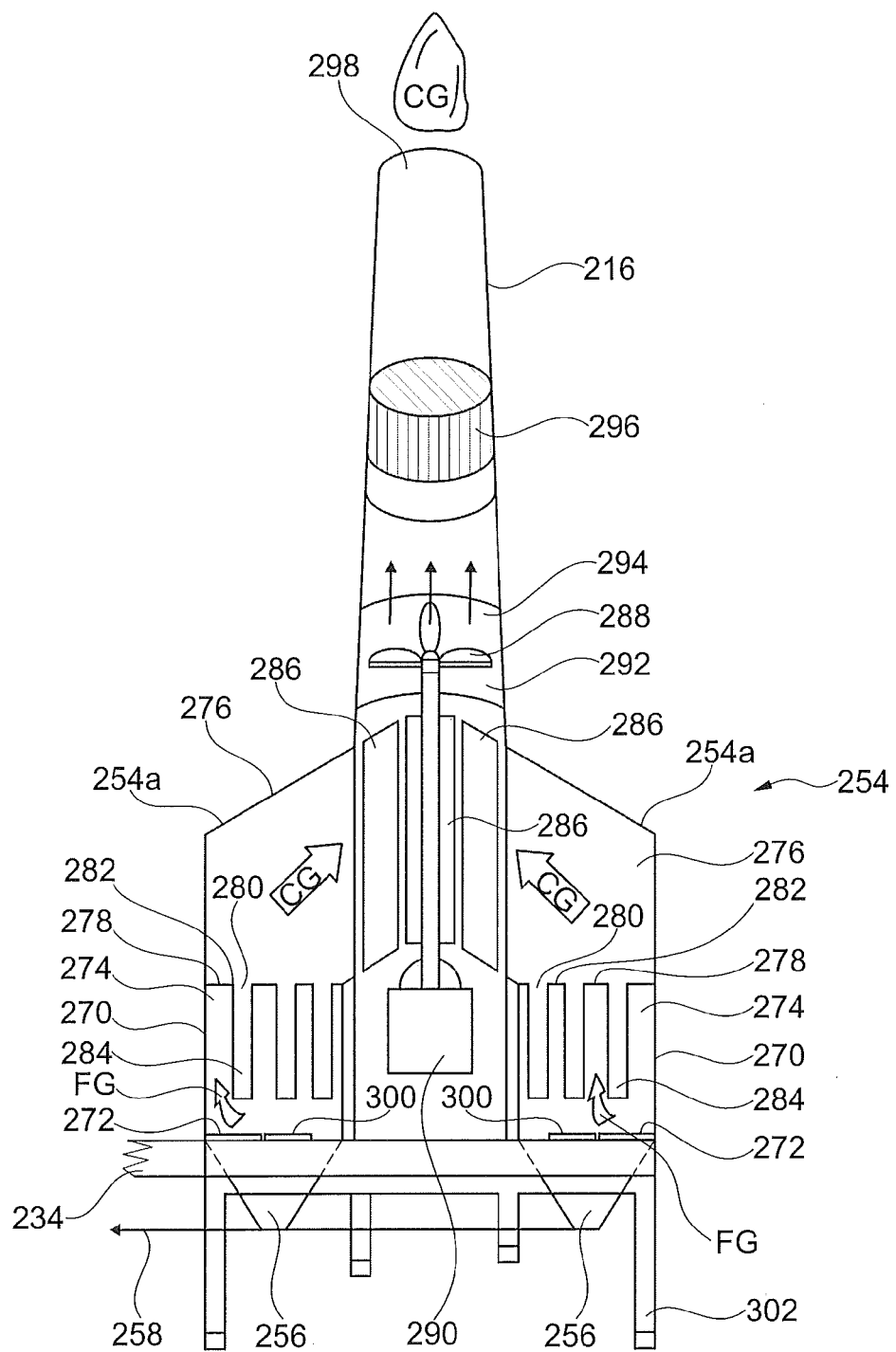
FIG. 4 is an enlarged schematic perspective side cross sectional view of the radial fabric filter of FIG. 3.

Best illustrated in FIG. 4, after intermixing contact with the flue gas FG, the resultant dry reacted reducing agent DR entrained by the flue gas FG flows from reactor 236 in vertical portion 234 of gas duct 232 and enters the fluidly connected radial fabric filter 254. Radial fabric filter 254 comprises a plurality of filter components 254a arranged radially around and fluidly connected to a central chimney 216. As such, the resultant dry reacted reducing agent DR entrained by the flue gas FG flows into a bottom portion 270 of one or more filter components 254a of radial fabric filter 254 via inlets 272. Inlet 272 of filter component 254a of radial fabric filter 254 is fluidly connected to a bag chamber 274. Bag chamber 274 of filter component 254a is separated from a top chamber 276 by a plate 278. Plate 278 includes a plurality of openings 280 each defined by a rim 282 to which a fabric bag 284 is removably connected for an air tight seal. Each top chamber 276 is fluidly connected to central chimney 216 via a chimney inlet 286. Arranged within central chimney 216 vertically above chimney inlets 286 is an axial fan 288. Axial fan 288 is operably connected to and powered by a motor 290. As such, axial fan 288 has a low pressure side 292 and a high pressure side 294. Of the two sides 292, 294 of axial fan 288, low pressure side 292 is in closest proximity to chimney inlets 286. Low pressure side 292 of axial fan 288 draws flue gas FG with entrained dry reacted reducing agent DR into at least one of the plurality of filter components 254a of radial fabric filter 254 via inlets 272. As the flue gas FG with entrained dry reacted reducing agent DR is drawn from bag chamber 274 to top chamber 276 via fabric bags 284 and openings 280, particulate matter including dry reacted reducing agent DR is captured on exterior surface 284a of fabric bags 284. Periodically, particulate matter including dry reacted reducing agent DR is dislodged from exterior surface 284a of fabric bags 284 and collected in hoppers 256 below. Particulate matter including dry reacted reducing agent DR collected in hoppers 256 of filter components 254a of radial fabric filter 254 is transported through fluidly connected duct 258 to fluidly connected container 248 for mixture with the moistened reducing agent MR therein. Alternatively, a portion of particulate matter including dry reacted reducing agent DR collected in hoppers 256 may be transported elsewhere for other purposes. Clean flue gas CG in top chamber 276 of filter component 254a is drawn from radial fabric filter 254 by axial fan 288 through chimney inlets 286 into central chimney 216. Within central chimney 216, clean flue gas CG is blown by high pressure side 294 of axial fan 288 through an optional noise baffle 296 arranged within central chimney 216 vertically above axial fan 288, and out top open end 298 for release to the atmosphere.

During periods of low demand, overall plant 210 efficiency dictates reduced plant 210 production or turn down. Such periods of reduced plant 210 production or turn down are referred to as the plant 210 operating under "low load" conditions. Under low load conditions, less fuel F is combusted in the system boiler 212 and less flue gas FG is produced. Under such low load conditions or for filter component 254a maintenance, one or more of the plurality of filter components 254a may be taken out of service as desired or as needed by closing inlet 272 with a sliding or hinged damper 300. As such, filter components 254a may be relatively easily taken off line during low load operation or for purposes maintenance. Likewise, under normal or high load conditions or upon completion of filter component 254a maintenance, filter components 254a may be added to service as desired or as needed by opening inlet 272 by sliding or moving hinged damper 300 away from coving or blocking inlet 272. As such, filter components 254a may be relatively easily brought on line during normal or high load operation or upon completion of maintenance. Likewise, radial fabric filter 254 may be supported by a support structure 302 for increased access for ease of maintenance thereof. Likewise, additional filter components 254a may be added radially around central chimney 216 as needed upon system 214 expansion.

In addition to the previously noted advantages and benefits, the subject radial fabric filter 254 achieves significant technological improvements over the prior art system 14 illustrated in FIG. 1 above. One such improvement is that by arranging the filter chambers 254a radially around the central chimney 216, each filter chamber 254a receives approximately the same flue gas FG load. To the contrary, as illustrated in FIG. 1, prior art fabric filter 54 is arranged so bag filter compartments first contacted by the flow of flue gas FG receive a heavier flue gas load than bag filter compartments downstream thereof. Also, the subject radial fabric filter 254 provides a significant increase in fabric bag 284 active filter area since each filter chamber 254a is arranged with the inlet 272 opposite the chimney inlet 286. Further, the subject radial fabric filter 254 creates a reduced pressure loss over the prior art system 14 illustrated in FIG. 1 above, since each filter chamber 254a is directly connected to central chimney 216 rather than having additional costly ductwork 60 to connect to stack 16.

In summary, the present disclosure provides a radial fabric filter 254 for particulate collection from a flue gas FG produced in a combustion process to produce a clean flue gas CG. The radial fabric filter 254 comprises a plurality of filter chambers 254a arranged radially around a central chimney 216 and an axial fan 288 arranged within the central chimney 216 operable to draw flue gas FG into at least one of the filter chambers 254a for particulate collection therein to produce clean flue gas CG prior to blowing the clean flue gas CG through the central chimney 216 for release, further treatment or use. Each filter chamber 254a comprises an inlet 272 with a damper 300 movable for opening and closing the inlet 272. Also, each filter chamber 254a comprises fabric bags 284 for particulate collection. The radial fabric filter 254 may be supported by a support structure 302 to allow for relatively easy access to the filter chambers 254a for maintenance thereof. Further, the central chimney 216 may optionally include a baffle 296 therein for noise reduction.

The present disclosure likewise provides a system 214 for treating flue gas FG produced in a combustion process to produce clean flue gas CG. The system 214 comprises a moistened reducing agent distribution device 238 operable within a dry scrubber reactor 236 to disperse reducing agent within flue gas FG flowing through the dry scrubber reactor 236, and a radial fabric filter 254 comprising a plurality of filter chambers 254a arranged radially around a central chimney 216 with an axial fan 288 arranged within the central chimney 216 operable to draw the flue gas FG with entrained reacted reducing agent into at least one of the filter chambers 254a for particulate collection therein to produce clean flue gas CG prior to blowing the clean flue gas CG through the central chimney 216 for release, further treatment or use. Each filter chamber 254a comprises an inlet 272 with a damper 300 movable for opening and closing the inlet 272. Also, each filter chamber 254a comprises fabric bags 284 for particulate collection.

The present disclosure likewise provides a method of using a radial fabric filter 254 for particulate collection from a flue gas FG produced in a combustion process to produce clean flue gas CG. The method comprises arranging a plurality of filter chambers 254a radially around a central chimney 216, drawing with an axial fan 288 arranged within the central chimney 216 flue gas FG into at least one of the filter chambers 254a for particulate collection therein to produce clean flue gas CG, and blowing the clean flue gas CG through the central chimney 216 for release, further treatment or use. Each filter chamber 254a comprises an inlet 272 with a damper 300 movable for opening and closing the inlet 272. Also, each filter chamber 254a comprises fabric bags 284 for particulate collection. The radial fabric filter 254 may be supported by a support structure 302 to allow for relatively easy access to the filter chambers 254a for maintenance thereof. Further, the central chimney 216 may optionally include a baffle 296 therein for noise reduction.

The present disclosure likewise provides a method of using a system 214 for treating flue gas FG produced in a combustion process to produce clean flue gas CG. The method comprises dispersing a moistened reducing agent within a dry scrubber reactor 236 to disperse reducing agent within flue gas FG flowing through the dry scrubber reactor 236, and using a radial fabric filter 254 comprising a plurality of filter chambers 254a arranged radially around a central chimney 216 with an axial fan 288 arranged within the central chimney 216 to draw the flue gas FG with entrained reacted reducing agent into at least one of the filter chambers 254a for particulate collection therein to produce clean flue gas CG prior to blowing the clean flue gas CG through the central chimney 216 for release, further treatment or use. Each filter chamber 254a comprises an inlet 272 with a damper 300 movable for opening and closing the inlet 272. Also, each filter chamber 254a comprises fabric bags 284 for particulate collection. The radial fabric filter 254 may be supported by a support structure 302 to allow for relatively easy access to the filter chambers 254a for maintenance thereof. Further, the central chimney 216 may optionally include a baffle 296 therein for noise reduction.

Various system embodiments and methods have been described herein. The descriptions are intended to be illustrative. It will be apparent to one of skill in the art that modifications may be made to the embodiments as described without departing from the scope of the claims set forth below. For example, it is to be understood that although some of the embodiments have been described in the context of an AQCS of a particular arrangement, it should be appreciated that other arrangements may be used without deviation from the spirit and scope of the claims below.

The invention claimed is:

1. A radial fabric filter for particulate collection from a flue gas produced in a combustion process to produce a clean flue gas, comprising:
a plurality of filter chambers arranged radially around a vertical central chimney; and
an axial fan arranged within the vertical central chimney operable to draw flue gas into at least one of the filter chambers for particulate collection therein to produce clean flue gas prior to blowing the clean flue gas through the vertical central chimney for release, further treatment or use.

2. The radial fabric filter according to claim 1, wherein each filter chamber comprises an inlet with a damper movable for opening and closing the inlet.

3. The radial fabric filter according to claim 1, wherein each filter chamber comprises fabric bags for particulate collection.

4. The radial fabric filter according to claim 1, wherein the radial fabric filter is supported by a support structure.

5. The radial fabric filter according to claim 1, wherein the central chimney comprises a baffle.

6. A system for treating flue gas produced in a combustion process to produce clean flue gas comprising:
a moistened reducing agent distributor device operable within a vertical dry scrubber reactor to disperse reducing agent within flue gas flowing through the vertical dry scrubber reactor; and
a radial fabric filter comprising a plurality of filter chambers arranged radially around a vertical central chimney with an axial fan arranged within the vertical central chimney operable to draw the flue gas with entrained reacted reducing agent into at least one of the filter chambers for particulate collection therein to produce clean flue gas prior to blowing the clean flue gas through the vertical central chimney for release, further treatment or use.

7. The system according to claim 6, wherein each filter chamber comprises an inlet with a damper movable for opening and closing the inlet.

8. The system according to claim 6, wherein each filter chamber comprises fabric bags for particulate collection.

9. A method of using a radial fabric filter for particulate collection from a flue gas produced in a combustion process to produce clean flue gas, comprising:
arranging a plurality of filter chambers radially around a vertical central chimney;
drawing with an axial fan arranged within the vertical central chimney flue gas into at least one of the filter chambers for particulate collection therein to produce clean flue gas; and
blowing the clean flue gas through the vertical central chimney for release, further treatment or use.

10. The method according to claim 9, wherein each filter chamber comprises an inlet with a damper movable for opening and closing the inlet.

11. The method according to claim 9, wherein each filter chamber comprises fabric bags for particulate collection.

12. The method according to claim 9, wherein the radial fabric filter is supported by a support structure.

13. A method of using system for treating flue gas produced in a combustion process to produce clean flue gas comprising:
dispersing a moistened reducing agent within a vertical dry scrubber reactor to disperse reducing agent within flue gas flowing through the vertical dry scrubber reactor; and
using a radial fabric filter comprising a plurality of filter chambers arranged radially around a vertical central chimney with an axial fan arranged within the vertical central chimney to draw the flue gas with entrained reacted reducing agent into at least one of the filter chambers for particulate collection therein to produce clean flue gas prior to blowing the clean flue gas through the vertical central chimney for release, further treatment or use.

14. The method according to claim 13, wherein each filter chamber comprises an inlet with a damper movable for opening and closing the inlet.

15. The method according to claim 13, wherein each filter chamber comprises fabric bags for particulate collection.

* * * * *